UNITED STATES PATENT OFFICE.

ARTHUR B. LAMB, OF CAMBRIDGE, MASSACHUSETTS, AND WILLIAM C. BRAY, OF BERKELEY, CALIFORNIA.

PROCESS OF MAKING IODIC ACID.

No Drawing.     Application filed July 17, 1922.   Serial No. 575,601.

*To all whom it may concern:*

Be it known that we, ARTHUR B. LAMB and WILLIAM C. BRAY, citizens of the United States, residing at Cambridge, Massachusetts, and Berkeley, California, respectively, have invented certain new and useful Improvements in Processes of Making Iodic Acid, of which the following is a specification.

This invention relates to iodic anhydride and a process of making same.

Among the objects of this invention is to produce iodic anyhydride or iodine pentoxide by a process which is characterized by high efficiency and with substantially no loss of iodine. A further object of this invention is to produce a product which, on analysis, will show substantially 100% $I_2O_5$, which possesses a uniform white or faintly pink color, and which will not decompose at temperatures of around 250° C. even when heated in the presence of ordinary pure air. A still further object of this invention is to produce iodic anhydride which can be used in the detection and analysis of carbon monoxide.

The prior processes which have been used and recommended for the preparation of $I_2O_5$ have been found to be difficult, wasteful and expensive; especially, for large scale operations. In these methods, iodic acid is first prepared and then subjected to dehydration and transformation into the anhydride. During this last treatment, considerable loss of material is occasioned by the decomposition of the iodic acid, resulting in an evolution of iodine.

In order to overcome the disadvantages incident to the prior processes a new method has been devised for preparing the iodic acid. By this method iodine is oxidized by means of a solution of chloric acid thereby forming iodic acid, according to the following reaction:

$$3I_2 + 5HClO_3 + 3H_2O = 6HIO_3 + 5HCl$$

Some of the hydrochloric acid resulting from this reaction is lost and driven off by evaporation, but that which remains tends to react with a portion of the iodic acid formed, yielding iodine according to the following reaction:

$$2HIO_3 + 10HCl = I_2 + 5Cl_2 + 6H_2O.$$

This second reaction is, however, reversible and rapid, and the reverse reaction takes place rapidly when sufficient water is present. Also, the direct reaction between iodic acid and hydrochloric acid, even when the latter is heated, altho at first rapid is by no means complete. It was found that the effect of any reaction between hydrochloric and iodic acids could be counteracted by using an excess of chloric acid, which when present in the solution will react with any iodine that may tend to be liberated by the reaction between the hydrochloric and iodic acids. A 3% excess of chloric acid (based on the reaction given in the first equation) has been found sufficient to prevent any loss of iodine. When this excess of chloric acid is present the solution containing the iodic and hydrochloric acids may be evaporated, the hydrochloric acid will be removed as chlorine, and there will be no loss of iodine during this evaporation. In fact, during the evaporation the net reaction is:

$$5HCl + HClO_3 = 3Cl_2 + 3H_2O.$$

This reaction is under the conditions of the process irreversible.

A specific example of carrying out this invention is as follows: To a given quantity of commercial, resublimed iodine there is added an amount of chloric acid containing 3% in excess of the theoretical amount. Concentrations of the chloric acid of 20 to 30% give satisfactory results, the most desirable concentrations being around 25%. With lower concentrations, the reaction takes place slowly, even when the mixture is heated to boiling. With higher concentrations of chloric acid the speed of the reaction is increased and if concentrations of 33–40% are employed, the reaction starts practically immediately at room temperature and proceeds with almost explosive violence, thus necessitating the cooling of the container with ice-cold water during the reaction. If it is desired to recover or sorb the chlorine evolved during the reaction, the process may be conducted in a closed system and a slow current of air passed thru the apparatus after the reaction has started. The reaction is facilitated by initial heating, but if the material is not preliminarily heated the reaction will start in about 10 or 15 minutes.

After the reaction, the solution is cooled and then filtered to remove any foreign matter, such as barium iodate which may be present as the result of the contamination of the chloric acid with barium chlorate. The filtrate is transferred to an evaporator and evaporated just to dryness, with frequent stirring. If, during the evaporation, a yellow-brown color appears, showing a tendency toward decomposition of the iodic acid, a small amount of chloric acid should be added to counteract this tendency. The material is then heated in a hot-air oven at a temperature of 150–160° C. for about 3 hours and then removed from the evaporator for more complete dehydration.

In the preferred dehydration process, the material which is first reduced to a coarse powder is loosely packed in glass tubes of about 30 mm. in diameter and closed at one end. A column of iodic acid is held in position by glass wool at each end, and a thermometer is imbedded in the iodic acid for showing the actual temperature of the material. Near the bottom of each tube a smaller tube is inserted, thru which a slow current of dry air may be drawn, the air being preheated by passing thru the oven before reaching the iodic acid. The air is also preferably first dried by passing thru a chain consisting of a sulphuric acid bead-tower and a U-tube containing $P_2O_5$ and soda lime. The rate of flow may be regulated by observation of the bubbling thru the acid tower.

One or more of these tubes are placed in a horizontal position in a well insulated horizontal oven which is uniformly heated by gas flames. A constant temperature of about 235–240° C. is maintained for about 3 hours during which time a slow current of dry air is drawn thru the material.

The material prepared by this chloric acid process and then dehydrated in this way gives a product possessing a uniformly white or faintly pink color and which contains not more than 0.5% of water; usually, not over 0.2–0.3% water. The intensity of the color as it varies from pink to violet is an indication of the amount of decomposition during dehydration, due to local overheating or to the presence of impurities. The pure iodic anhydride prepared by the chloric acid method may be heated to about 250° C. with substantially no liberation of iodine. The material is hygroscopic and if kept, should be stored in sealed containers.

Both the iodic acid and the iodic anhydride prepared by this chloric acid process are superior than the materials prepared by the prior process and will not be decomposed when heated with pure air, thus possessing great value in the analysis and detection of carbon monoxide.

Iodic anhydride, as prepared by prior methods is unreliable for qualitative and quantitative analysis of carbon monoxide because such material invariably gives a positive blank, for which a correction must be applied even with pure air. This difficulty, however, which is the limiting factor in the precise analysis of small concentrations of carbon monoxide can be eliminated by using iodic anhydride prepared by this chloric acid method.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A process comprising converting iodine to iodic acid by treating with an excess of chloric acid.

2. A process comprising converting iodine to iodic acid by treating with about 3% excess of chloric acid.

3. A process comprising oxidizing iodine to iodic acid by means of a solution containing about 25% chloric acid and in such quantity as to constitute an excess over that required for oxidization.

4. A process comprising oxidizing iodine to iodic acid by means of a 3% excess of chloric acid in a solution of about 25% concentration.

In testimony whereof we affix our signatures.

ARTHUR B. LAMB.
WILLIAM C. BRAY.